(12) United States Patent
Bae (10) Patent No.: US 12,237,782 B2
(45) Date of Patent: Feb. 25, 2025

(54) HITTING-ELECTRIC DEVICE AND HITTING-ELECTRIC GENERATION DEVICE USING THE SAME

(71) Applicant: Sang-Cheol Bae, Daegu (KR)

(72) Inventor: Sang-Cheol Bae, Daegu (KR)

( * ) Notice: Subject to any disclaimer, the term of this patent is extended or adjusted under 35 U.S.C. 154(b) by 806 days.

(21) Appl. No.: 17/500,512

(22) Filed: Oct. 13, 2021

(65) Prior Publication Data

US 2022/0200488 A1   Jun. 23, 2022

(30) Foreign Application Priority Data

Dec. 22, 2020   (KR) .................. 10-2020-0180606

(51) Int. Cl.
*H02N 2/18* (2006.01)
*F03D 9/25* (2016.01)

(52) U.S. Cl.
CPC ............ *H02N 2/183* (2013.01); *F03D 9/25* (2016.05); *F05B 2220/709* (2013.01)

(58) Field of Classification Search
CPC .......... H02N 2/183; H02N 2/185; H02N 2/18; H02N 2/005; H10N 30/308; H10N 30/853; F03D 9/25; F03D 3/061; F03D 3/062; F05B 2220/709; Y02E 10/72
See application file for complete search history.

(56) References Cited

U.S. PATENT DOCUMENTS 11,171,578 B2 *  11/2021  Yang ............... H10N 30/30
2016/0294308 A1 *  10/2016  Chen ............... H02N 2/18

FOREIGN PATENT DOCUMENTS

WO    WO2014051299 A1    4/2014

* cited by examiner

*Primary Examiner* — Emily P Pham
(74) *Attorney, Agent, or Firm* — STIP Law Group, LLC (57) ABSTRACT

An hitting-electric device and a power generation device using the same according to the present invention may include a wind power collection unit including a fixed blade part, and a rotation blade part, accommodated in the fixed blade part and provided to be rotatable relative to the fixed blade part; a rotation shaft coupled to the rotation blade part and disposed extending downwardly, and provided with at least one trigger to which hitting-electric power is applied along an outer surface periphery; and an generation unit provided at a lower portion of the wind power collection unit and generating electricity by a hitting-electric power which the trigger hits.

11 Claims, 10 Drawing Sheets

HITTING-ELECTRIC DEVICE AND HITTING-ELECTRIC GENERATION DEVICE USING THE SAME

CROSS-REFERENCE TO RELATED APPLICATIONS

This application claims the priority of the Korean Patent Applications NO 10-2020-0180606 filed on Dec. 22, 2020, in the Korean Intellectual Property Office, the disclosure of which is incorporated herein by reference.

TECHNICAL FIELD

The present invention relates to an hitting-electric device and a hitting-electric generation device using the same, and more particularly to an hitting-electric device and a generation device using the same, in which a piezo thin film layer is bond to a plate-shaped plate having a predetermined thickness or more to improve durability of a piezo device and coupled in a fork type to generate a howling phenomenon due to electric energy generation by hit, capable of increasing electricity generation and improving power generation.

DISCUSSION OF RELATED ART

A piezoelectric device refers to a material in which D and G values are formed due to distortion of PIEZO when mechanical pressure is applied from outside and an electromotive force is generated by a potential difference due to electric polarization, and materials such as $PZT(Pb(Ti,Zr)O_3)$, $Ba_2TiO_4$, $BaTiO_3$, and ceramics are used as piezoelectric devices.

Such a piezoelectric device has properties that an electrical signal, for example, a voltage, is generated when a mechanical change is applied to a material by an external force such as a force or impact applied to the device itself, and many attempts have been made to use a piezoelectric device for power generation using the same.

A piezoelectric device in the related art has generated electric energy by applying an impact or external force to the device itself. A spark igniter of a gas range or an ignition part of a disposable gas lighter may be examples. Alternatively, there is also a related technology of A piezoelectric element and Power generation apparatus using it (Korean Patent Application No. 10-2012-0106246).

However, in a method of giving a direct impact to a piezoelectric device (Piezo or PZT), durability such as breaking of a device is significantly reduced, and in the case of the piezoelectric device coupled to a base plate, although the base plate is deformed macroscopically, the piezoelectric device inevitably generates a similar amount of displacement, so that there is a problem in that the piezoelectric device is easily torn due to an external force of an ultra-short wave and durability is weakened due to increased fatigue.

Therefore, PZT, which is used for a spark igniter of a gas range or an ignition part of a disposable gas lighter in the related art, is made thick and hard so as not to be broken, although an impulse-type voltage is generated, it is almost impossible to use for storage due to almost like noise, and although a very short impulse-type voltage is generated, a piezoelectric effect, that is, a piezoelectric generation effect generated by bending of PZT like a carp scale, may not be expected.

In addition, a conventional method in which a force is applied both directly or indirectly to a piezoelectric device is merely generating a pulse signal having a large peak value in the piezoelectric device due to a single, one-time external force, so that a total amount of electric energy to be generated is impulse type and limited, and accordingly, a management and control are difficult, an ESS PCB design is difficult, and storage and keeping in capacitors or batteries or the like are difficult due to properties, limited applications or the like of the piezoelectric device, so that there is a problem that durability is weak and power generation efficiency is low.

SUMMARY OF DISCLOSURE

Technical Problem

The present invention is directed to solving the above described problems, when an external force is applied, in order to obtain a piezoelectric effect of a piezo, high voltage generation of ultra-short waves and power generation amount of a wide sine wave area, and to improve durability, a hitting-electric device is manufactured by epoxidizing the piezo (piezo with a thickness of 0.35T or more is broken without bending) of thin film about 0.20T to a device plate of about 2.00T or more which is about 10 times thick, so that a high and stable power generation electromotive force and durability are guaranteed.

In addition, since the piezo configuring the piezoelectric device is a thin film and is easily broken, the piezo should be attached to a plate, and a device receives external force via the plate, so that in the case of electric energy generation by hit, the plate configuring the device, should be able to transmit conductive durability and an external force more effectively.

In the related art, for a purpose of a piezoelectric effect, soft brass (copper+zinc) was used, but in the case of electric energy by hit, for a purpose of ultra-short wave type high electromotive force and durability, phosphor bronze, stainless-steel, or the like, which may be a dense structure, fast transmission, strong and strong durability, sensitive to external forces, and a larger external force applying to the piezo, may be used. Further, non-ferrous metals, hard flat plastics, leather pulled from an outside or the like may be used for electric energy generation by hit.

At this point, in the case of non-conductive materials, including stainless-steel, non-ferrous metals, hard plastics, and leather pulled from an outside, internal resistance is greater compared with that of gold, silver, and copper, or electricity does not pass through, so that the non-convictive materials may not be suitable for power generation electromotive force and power storage efficiency.

To solve such problems, in the hitting-electric device, while a plate of materials such as phosphor bronze, stainless-steel, piano wire steel, and non-ferrous metals, hard flat plastics, and leather pulled from an outside, which have a strong structure, is used, when the piezo is bonded to the plate by epoxidizing, a thin film copper plate (wire) on a plate between the plate and the piezo is inserted, so that physical strength, such as a strong structure and transmission power of the plate, is obtained from strong non-ferrous metals, and due to electrical properties of the above-described non-ferrous metals, an internal resistance is very large, but copper (wire) with a small internal resistance is used as a negative electrode of a power generation output, and thus advantages of mechanical properties and advantages of electrical properties can be supplemented.

In addition, when an external force is applied, a thickness of the plate is varied so that resonance of the plate is increased and a long aftershock is induced, so that an amount of power generation may be additionally obtained, and a piezo part of a center is made thinner by making an outer portion of the piezo part thinner, so that a piezoelectric effect of which the piezo is bent repeatedly is maximized.

Accordingly, efficiency is increased by applying a principle of Bang-jjajing to the plate of a hitting-electric material.

Furthermore, provided is an hitting-electric device and a hitting-electric generation device using the same in which a piezo thin film layer may be bonded to a fork unit having a predetermined thickness or more, and as back surface or periphery of a coupling bed part is hit, an external force may be applied indirectly, so that cracking or tearing of the piezoelectric device (Plate and Piezo or PZT) may be minimized, and thus fatigue life can be reduced, and due to a structure which makes a rooter (a lower part of a V-shaped root) of a fork module thin or narrow, howling at the fork unit is promoted, so that a generated voltage and duration may be significantly increased, and thus a total amount of electric energy to be generated can be increased and power generation efficiency can be improved.

Technical Solution

An hitting-electric device and a hitting-electric generation device using the same according to the present invention for achieving the above object may use various external forces for inducing power generation of a hitting-electric device.

Included may be a wind power collection unit including a fixed blade part, when a wind harvesting is used, which should be turned well even in a slightest wind, which of a rotational force should be strong, in which as a result of the experiment, a vertical drag type blade is a most effective, and a wind is induced and concentrated into the blade which turns heading toward the wind as sudden wind (valley wind), and the wind is blocked acting as a resistance to a returning blade, and provided outside for a purpose of switching the wind direction to a blade which tunes heading toward with the wind, and a rotation blade part accommodated in the fixed blade part and provided to be rotatable relative to the fixed blade part; a rotation shaft coupled to the rotation blade part and disposed extending downwardly, and provided with at least one trigger to which a hitting-electric power is applied along an outer surface periphery; and an generation unit provided at a lower portion of the wind power collection unit and generating electricity by a hitting-electric power which the trigger hits.

The generation unit may include a hitting part, which interacts with the trigger and rotates in a clockwise or counterclockwise direction in a predetermined angle; and a fork module including a plurality of hitting-electric devices in which a piezo thin film layer is embedded at one surface.

In the fork module, the three hitting-electric devices may be coupled in a ⊏-shape to form an opening at one side, the hitting part may be partially inserted into the opening, and a fork handle for elastically supporting the fork module may be connected to any one of the hitting-electric devices. The fork module may have a structure in which a plurality of hitting-electric devices are coupled to each other in a V-shape and an opening is formed on one side.

The hitting-electric device may include: a hitting-electric plate to which the piezo thin film layer is bonded to one surface while a predetermined thickness is maintained by a predetermined size in a radial direction from a center; a support guide part provided in an edge area of the hitting-electric plate and supporting the hitting-electric plate; and a sounding induction surface part interposed between the hitting-electric plate and the support guide part, and tapered so that a cross-sectional thickness decreases from the hitting-electric plate toward the support guide part.

The hitting-electric plate may be provided to be about 10 times thick compared with that of the piezo thin film layer, a material of the hitting-electric plate may be made of any one selected from phosphor bronze, stainless-steel, steel, non-ferrous metals, hard flat plastics, stones and pulled leather and the sounding induction surface part may be manufactured so that a howling effect is maximized and a forging rate increases from a center toward an outer side in a radial direction.

In the fork module, a cathode wire part may be partially interposed between the piezo thin film layer and the hitting-electric plate.

An antiline vane having a convex curvature formed toward one side may be provided at the fixed blade part, and a syncline vane having a concave curvature formed toward the other side may be provided at the rotation blade part so as to be curved in a direction opposite to the antiline vane.

Advantageous Effects

In an hitting-electric device and a hitting-electric generation device using the same according to the present invention, a piezo thin film layer may be bonded to a hitting-electric device having a predetermined thickness or more, and an indirect external force may be applied as a back or side surface of the hitting-electric plate is hit, so that durability of the device may be significantly improved, and in contrast to a discharge phenomenon caused by low long-wave generation of a piezoelectric device in the related art, high generation of ultra-short waves per pulse may occur, and an external force transmitted to the device plate may be transmitted in a long wave, so that microscopic elastic deformation and restoration may occur relatively compared with the related art, so that cracking or tearing of the piezoelectric device may be minimized, and thus fatigue life can be reduced, and due to a structure of a fork module, howling at a hitting-electric device may be promoted, so that a generated voltage and duration may be significantly increased, and thus a total amount of electric energy to be generated can be increased and power generation efficiency can be improved.

DESCRIPTION OF DRAWINGS

FIG. 10(*a*) and FIG. 10(*b*) are a photograph illustrating voltage properties generated via an hitting-electric device and a hitting-electric generation device using the same according to an embodiment of the present invention.

DETAILED DESCRIPTION OF EXEMPLARY EMBODIMENTS

Hereinafter, with reference to the accompanying drawings, an embodiment of an hitting-electric device and a hitting-electric generation device using the same according to the present invention will be described in detail.

Figure 1:
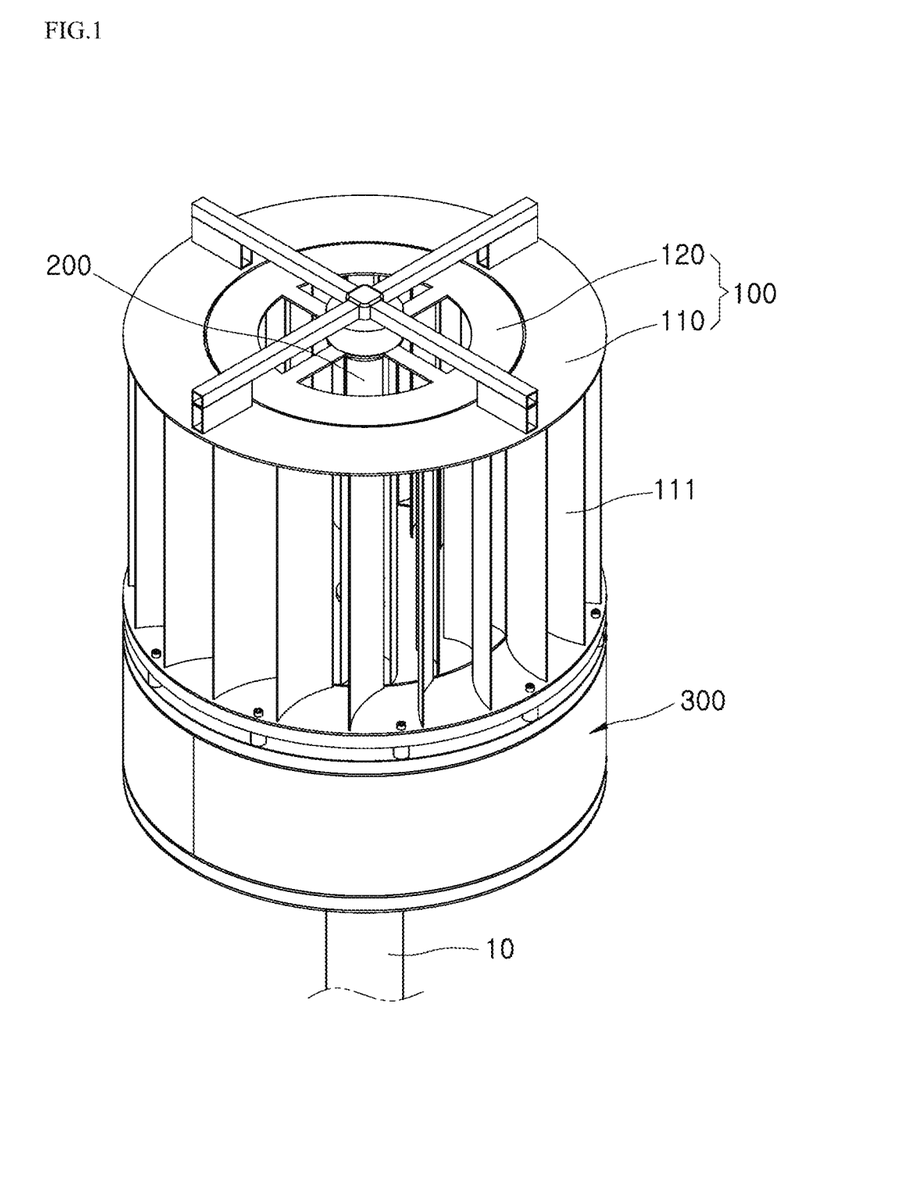
FIG. 1 is a perspective view of an hitting-electric device and a hitting-electric generation device using the same according to an embodiment of the present invention.
Figure 2:
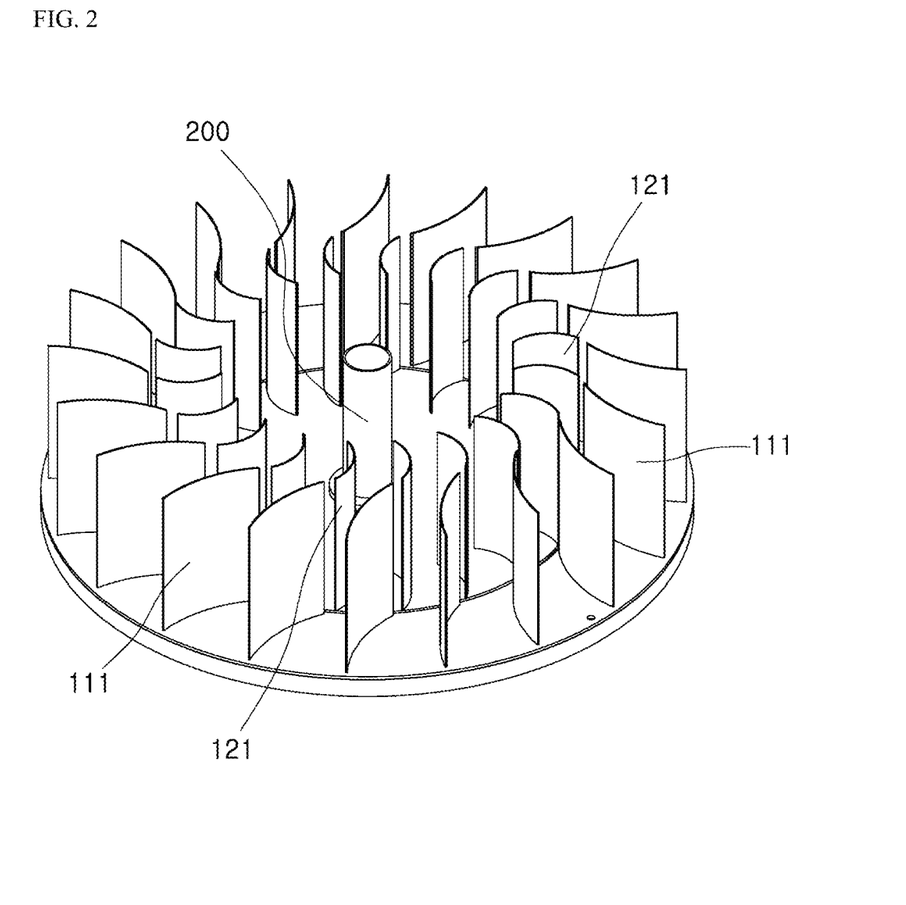
FIG. 2 is a cross-sectional perspective view of a wind power collection unit in FIG. 1.
Figure 3:
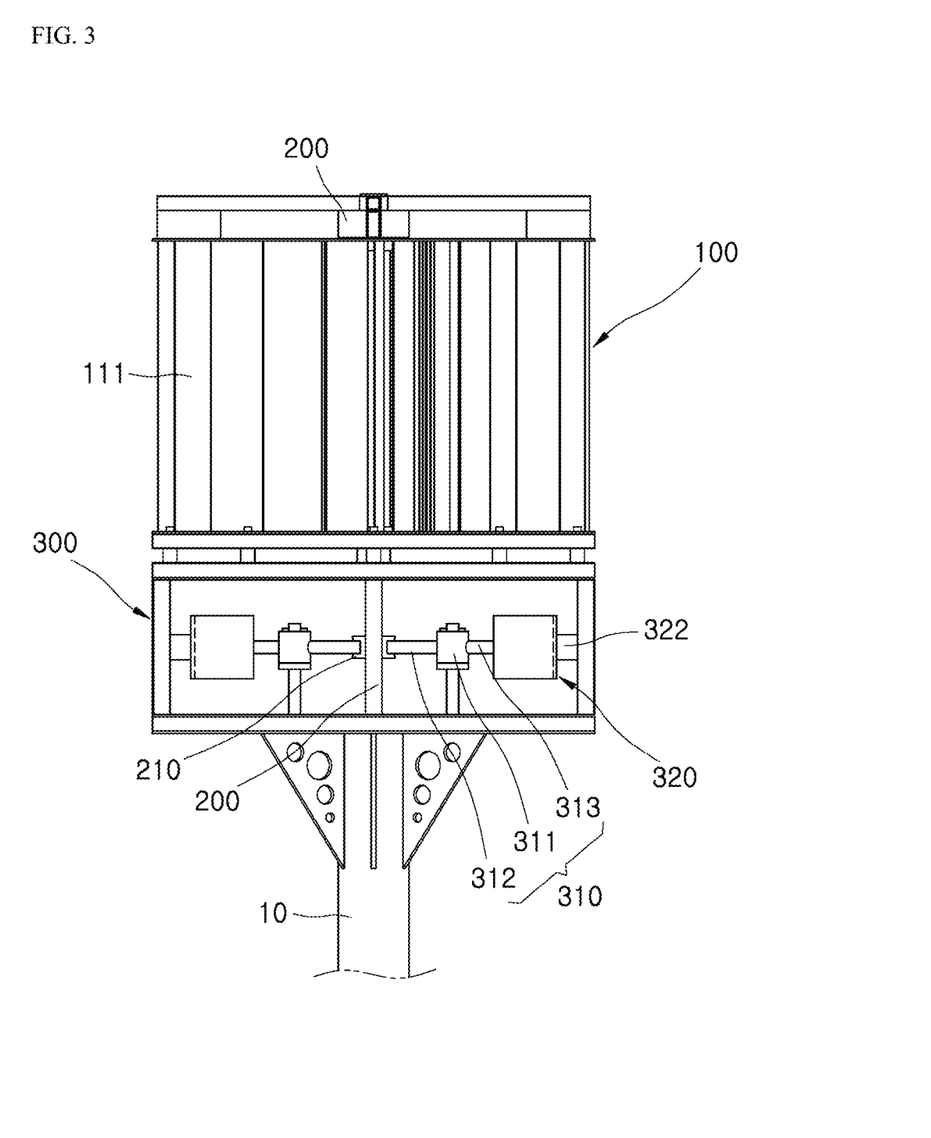
FIG. 3 is a front view of a cut-away state of a generation unit in an by hit and a hitting-electric generation device using the same according to an embodiment of the present invention.
Figure 4:
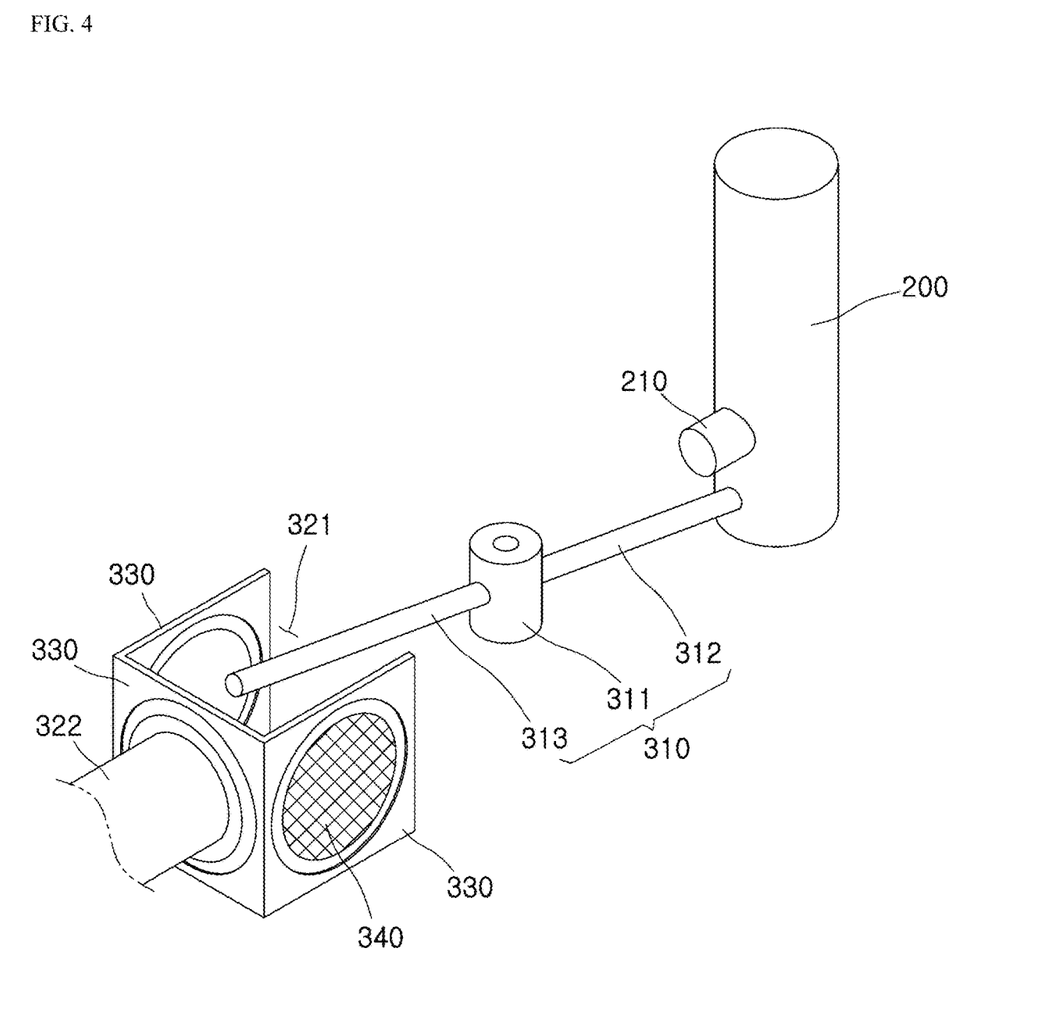
FIG. 4 is a schematic perspective view of a basic configuration of a generation unit in an hitting-electric device and a hitting-electric generation device using the same according to an embodiment of the present invention.
Figure 5:
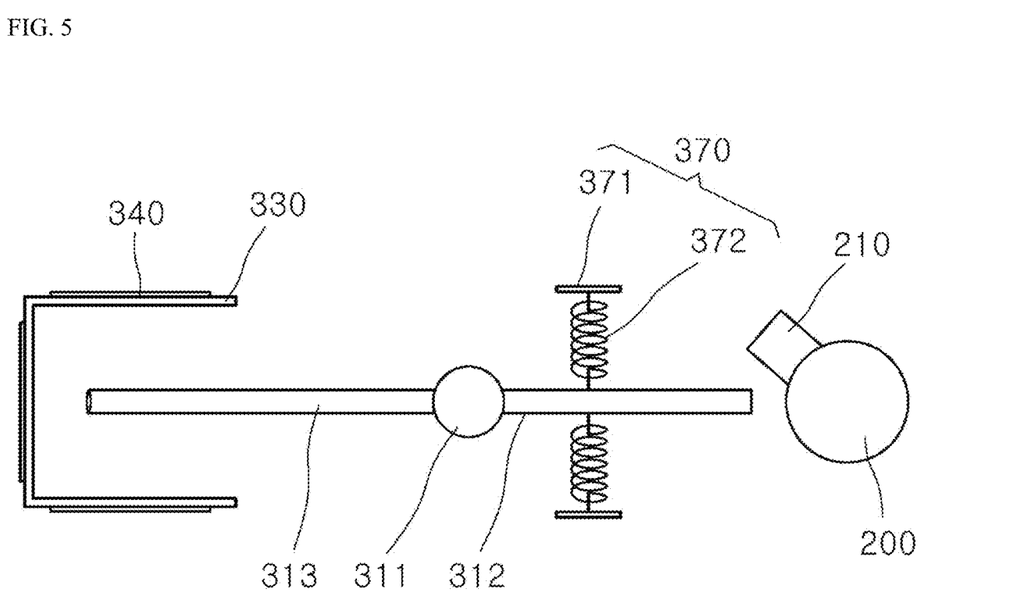
FIGS. 5 and 6 are plan views of application examples of a generation unit in an hitting-electric device and a hitting-electric generation device using the same according to an embodiment of the present invention.
Figure 6:
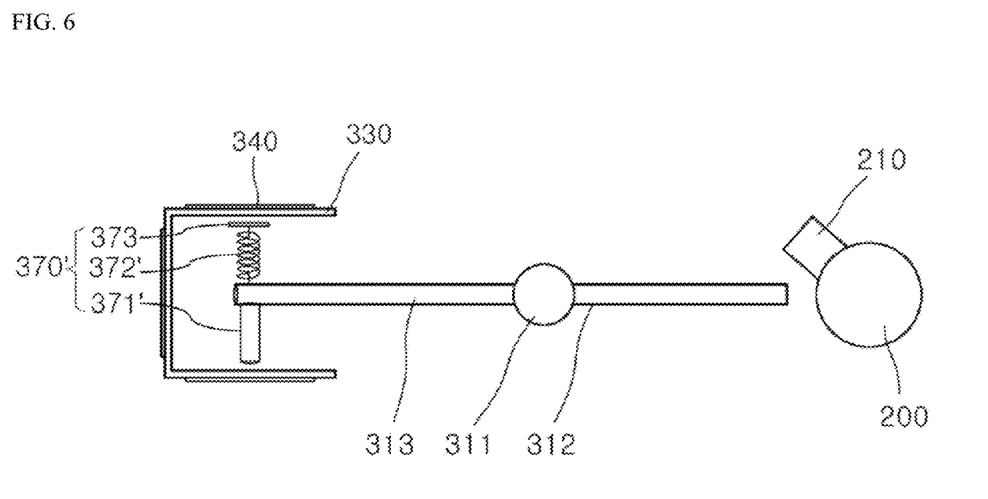
Figure 7:
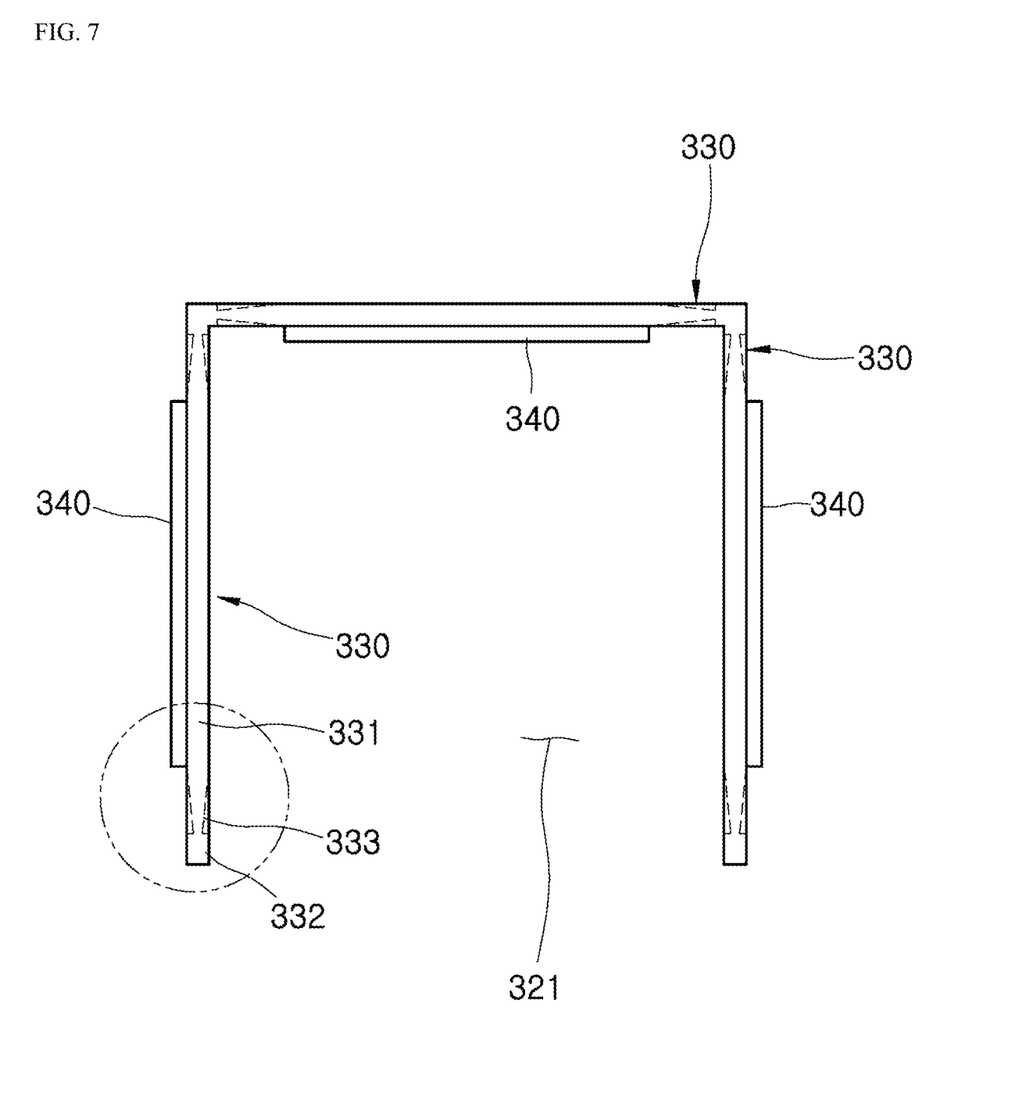
FIG. 7 is a plan view of a fork module in an hitting-electric device and a hitting-electric generation device using the same according to an embodiment of the present invention.
Figure 8:
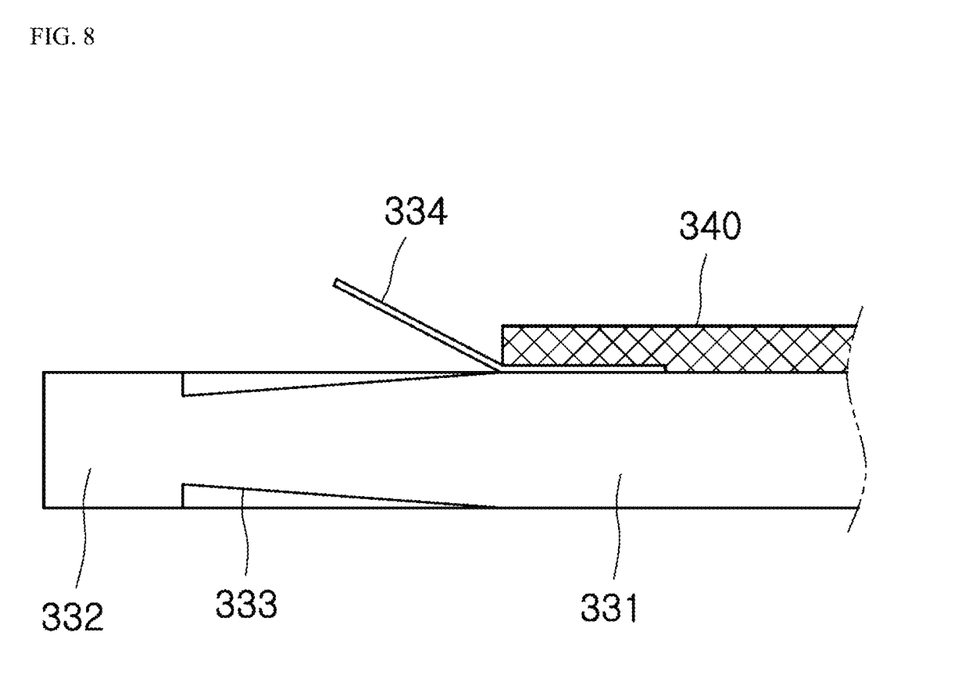
FIG. 8 is a cross-sectional view of a hitting-electric device in FIG. 7.

FIG. 1 is a perspective view of an hitting-electric device and a hitting-electric generation device using the same according to an embodiment of the present invention, FIG. 2 is a cross-sectional perspective view of a wind power collection unit in FIG. 1, FIG. 3 is a front view of a cut-away state of an generation unit in an hitting-electric device and a hitting-electric generation device using the same according to an embodiment of the present invention, FIG. 4 is a schematic perspective view of a basic configuration of an generation unit in an hitting-electric device and a hitting-electric generation device using the same according to an embodiment of the present invention, FIGS. 5 and 6 are plan views of application examples of an generation unit in an hitting-electric device and a hitting-electric generation device using the same according to an embodiment of the present invention, FIG. 7 is a plan view of a fork module in an hitting-electric device and a hitting-electric generation device using the same according to an embodiment of the present invention, and FIG. 8 is a cross-sectional view of a hitting-electric device in FIG. 7.

An hitting-electric device and a hitting-electric generation device using the same according to an embodiment of the present invention may include a wind power collection unit 100 including a fixed blade part 110, and a rotation blade part 120 accommodated in the fixed blade part 110 and provided to be rotatable relative to the fixed blade part 110; a rotation shaft 200 coupled to the rotation blade part 120 and disposed extending downwardly, and provided with at least one trigger 210 to which hitting-electric power is applied along an outer surface periphery; and an generation unit 300 provided at a lower portion of the wind power collection unit 100 and generating electricity by hitting-electric power which the trigger 210 hits.

The wind power collection unit 100 and the generation unit 300 may be disposed to be raised by a support part 10 by a predetermined height from a ground.

The wind power collection unit 100 may be disposed at an upper portion of the device. The wind power collection unit 100 mainly as shown in FIGS. 1 and 2 may include a fixed blade part 110 provided at an outer portion, and a rotation blade part 120 accommodated in the fixed blade part 110 and provided to be rotatable relative to the fixed blade part 110.

The fixed blade part 110 is a part for guiding wind so that external wind primarily is introduced into the wind power collection unit 100. For this, the fixed blade part 110 may be provided with an antiline vane having a convex curvature formed toward one side (one direction, to the right side when viewed from a top surface in FIG. 2).

In addition, the rotation blade part 120 may be rotatably provided at an inner portion of the fixed blade part 110. The rotation blade part 120 may be provided with a syncline vane 121 having a concave curvature formed toward the other side (to the left side in FIG. 2) so as to be curved in the opposite direction to the curvature of the antiline vane 111.

That is, a structure may be provided so that wind blowing to the left side is introduced via the antiline vane 111 of the fixed blade part 110, and a force is applied to the right side in the syncline vane 121 of the rotation blade part 120 so that the rotation blade part 120 is rotated in a counterclockwise direction.

As described above, as the curved surface shape is provided in a structure, which is continuously connected to the syncline vane 121 via the antiline vane 111, an external force stress due to eccentricity in the entire wind power collection unit 100 may be reduced.

In addition, as a space of the rotation blade part 120 is reduced compared with that of a wind introducing and discharging of the fixed blade part 110 and a density is high, a collected wind speed may be relatively increased in the rotation blade part 120. Accordingly, a rotation of the rotation blade part 120 may be facilitated and a rotational resistance may be remarkably reduced, so that the rotation blade part 120 may be easily rotated even in a fine wind, and thus wind power connection can be efficient and easy.

Referring mainly to FIGS. 2 and 3, the rotation shaft 200 may be coupled to the rotation blade part 120 and disposed extending downwardly. At least one trigger 210 to which hitting-electric power is applied along an outer surface periphery in the rotation shaft 200 may be provided. Here, the trigger 210 is a part, which drives the generation unit 300 to be described later. In the present embodiment, the number of trigger 210 is shown and described in two, but a scope of the present rights is not limited to the number.

Meanwhile, in a method of giving a direct impact to a piezoelectric device, durability of the device such as breaking the device is significantly reduced, and even in the case of the piezoelectric device coupled to the base plate, macroscopic elastic deformation and restoration is inevitable not only for the base plate but also the piezoelectric device, so that there was a problem that the piezoelectric device was easily torn due to an external force and fatigue life was increased.

Accordingly, in the present embodiment, the generation unit 300 of a method in which a hitting and hitting-electric power are transmitted indirectly may be provided.

Referring to mainly FIGS. 3 and 4, the generation unit 300 may include a hitting part 310 which interacts with the trigger 210 and rotates in a clockwise or counterclockwise direction in a predetermined angle; and a fork module 320 including a plurality of hitting-electric devices 330 in which a piezo thin film layer 340 is embedded at one surface.

The hitting part 310 may be disposed approximately at a center of the fork module 320 and the rotation shaft 200. The hitting part 310 may include a hitting hub 311, which is a body part, and first and second hitting bars 312 and 313 disposed in parallel at both sides.

A torsion spring (not shown) is embedded in the hitting hub 311, so that when rotating in one direction, a restoring force in an opposite direction may be applied.

In such the hitting part 310, the trigger 210 hits the first hitting bar 312, and accordingly, the hitting hub 311 and the second hitting bar 313 connected thereto may be driven and rotated in one direction.

In order to reduce durability degradation and noise caused by an impact of a touch stick at an end of the hitting bar 313 hitting in contact with the fork module 320, beads finished by wrapping a hard solid metal outside with a shock absorber such as epoxy or fabric rather than a strong and hard solid metal may be used. In addition, in some cases, a cushioning material, such as rubber, to a portion in which the hitting-electric plate 331 and the touch rod are in contact is attached, and thus a similar effect can be achieved.

In comparison, even when doing so, an amount of applied transmission is the same, durability of the hitting-electric devices is further guaranteed, and noise is remarkably reduced.

On the other hand, when a wind speed is strong, RPM of the rotation shaft 200 increases, and an amount of impact applied to the hitting-electric device 330 due to acceleration becomes very large, so that durability of the fork module 320 may be weakened. Accordingly, the generation unit 300 may further include a shock absorber 370 as shown in FIG. 5.

The shock absorber 370 may include a pair of support plates 371 disposed adjacent to a hitting hub and a buffer spring 372 interposed between the support plate 371 and the first hitting bar 312 to which the first hitting bar 312 is elastically biased.

Accordingly, even when a wind speed increases, even when a speed and number of times applied to the fork module 320 increases, the buffer spring 372 relieves an external force and applies the same external force, so that durability of the fork module 320 may be strengthened due to a role of braking against strong wind speed, or the like.

Additionally, even when an external force is applied due to a weak wind speed, the shock absorber 370 may act to apply the same external force, so that the same power generation may be implemented, thereby improving power generation efficiency.

In order to compensate for weakening durability of the fork module 320, the generation unit 300 may further include a shock absorber 370' as shown in FIG. 6.

The shock absorber 370' may include a support plate 371', a buffer spring 372' interposed between the support plate 371' and the second hitting bar 313 and a hitting member 373 vertically coupled to the second hitting bar 313.

As the rotation shaft 200 rotates in a counterclockwise direction, the buffer spring 372' may be compressed by the second hitting bar 313, and when the compression of the buffer spring 372' is released, the hitting member 373 briefly may cut the hitting-electric device 330 and then returns to an original state may be repeated.

According to such a mechanism, an external force may not be transmitted directly, but relieved by the buffer spring 372', and a force of the hitting member 373 to hit the hitting-electric device 330 may also be suppressed, so that durability of the fork module 320 may be improved, and power generation efficiency may also be improved.

Meanwhile, in examples of FIGS. 5 and 6, when a position of the hitting hub 311 and a length of the first and second hitting bars 312 and 313 are adjusted by applying a principle of lever, even with a small force (that is, even when a wind speed is weak), high power generation efficiency may be implemented.

The fork module 320 may be configured as an assembly of hitting-electric devices 330. The fork module 320 may be provided in an approximately square, U, V, ⊏-shape, or the like, and in the present embodiment, the three hitting-electric devices 330 included are provided in a ⊏-shape. At this point, a soft material advantageous for maintaining vibration or extending a vibration time may be applied to a portion for fixing the hitting-electric device 330.

The hitting-electric device 330 may include a hitting-electric plate 331 to which the piezo thin film layer is bonded to one surface while a predetermined thickness is maintained by a predetermined size in a radial direction from a center; a support guide part 332 provided in an edge area of the hitting-electric plate 331 and supporting the hitting-electric plate 331; and a sounding induction surface part 333 interposed between the hitting-electric plate 331 and the support guide part 332 and tapered so that a cross-sectional thickness decreases from the hitting-electric plate 331 toward the support guide part 332.

The hitting-electric plate 331 may be a base plate substantially coupled to the piezo thin film layer 340. The hitting-electric plate 331 may be provided to be about 10 times thick compared with that of the piezo thin film layer, and in the present embodiment, the hitting-electric plate 331 may have a thickness of 3.0 T (mm) or more.

A material of the hitting-electric plate 331 may be made of any one selected from phosphor bronze, stainless-steel, steel, non-ferrous metals, hard flat plastics, stones, and pulled leather.

The support guide part 332 may be provided in an edge area of the hitting-electric plate 331, and in the present embodiment, the support guide part 332 may be provided in an approximately rectangular shape. Such a support guide part 332 serves to support the hitting-electric plate 331.

The sounding induction surface part 333 may be interposed between the hitting-electric plate 331 and the support guide part 332. The sounding induction surface part 333 may have a tapered shape such that a cross-sectional thickness decreases from the hitting-electric plate 331 toward the support guide part 332.

The sounding induction surface part 333 may be manufactured by the so-called Bangjja technology of Kwaenggwari (small gong) or Jing (gong) such that a forging rate increases from a center toward an outer side in a radial direction so that a howling effect is maximized.

Via such a sounding induction surface part 333, when an impact is applied to a back surface of the hitting-electric device 330, that is, an opposite surface of the piezo thin film layer 340 by a hitting-electric power, microscopic elastic deformation of the hitting-electric plate 331 may be relatively induced compared with the related art. However, since the hitting-electric plate 331 is provided at a predetermined thickness or more, macroscopic deformation is not occurred, so that durability may be maintained and the piezoelectric device may be advantageous in terms of easily torn or fatigue life.

The fork module 320 may be provided by coupling the hitting-electric devices 330 in a V, U, or ⊏-shape, and an opening 321 may be formed at one side. Here, the first hitting bar 312 of the hitting part 310 may be partially inserted into the opening 321. In the present embodiment, the three hitting-electric devices 330 may be coupled in a ⊏-shape.

A fork handle 322 for elastically supporting the fork module 320 may be connected to any one of the hitting-electric devices 330. Such a fork handle 322 is connected to a support frame, and the hitting-electric devices 330 may be in a state of floating in an air. Accordingly, a howling phenomenon (so-called resonance) may be implemented in the hitting-electric devices 330 with respect to the fork handle 322.

In the present embodiment, the fork handle is provided in a horizontal direction and the plurality of hitting-electric devices 330 are fixed from a side thereof, otherwise, it is no problem that the fork module 320 is provided in a structure, which stands upright or hangs from above with respect to a bottom surface.

In the fork module 320, a cathode wire part 334 may be partially interposed between the piezo thin film layer 340 and the hitting-electric plate 331.

Via the fork module 320 of such a configuration, as the piezo thin film layer 340 is coupled to the hitting-electric device 330 having a predetermined thickness or more and a back surface of the hitting-electric plate 331 is hit, an indirect external force may be applied, so that durability of the device may be significantly improved, and as microscopic elastic deformation and restoration occur relatively compared with the related art, so that cracking or tearing of the piezoelectric device may be minimized, and thus fatigue life can be reduced.

In addition, due to a structure of the fork module 320, howling to the hitting-electric device 330 may be promoted, a generated voltage and duration may be significantly increased, and thus a total amount of electric energy to be generated can be increased and power generation efficiency can be improved.

Figure 9:
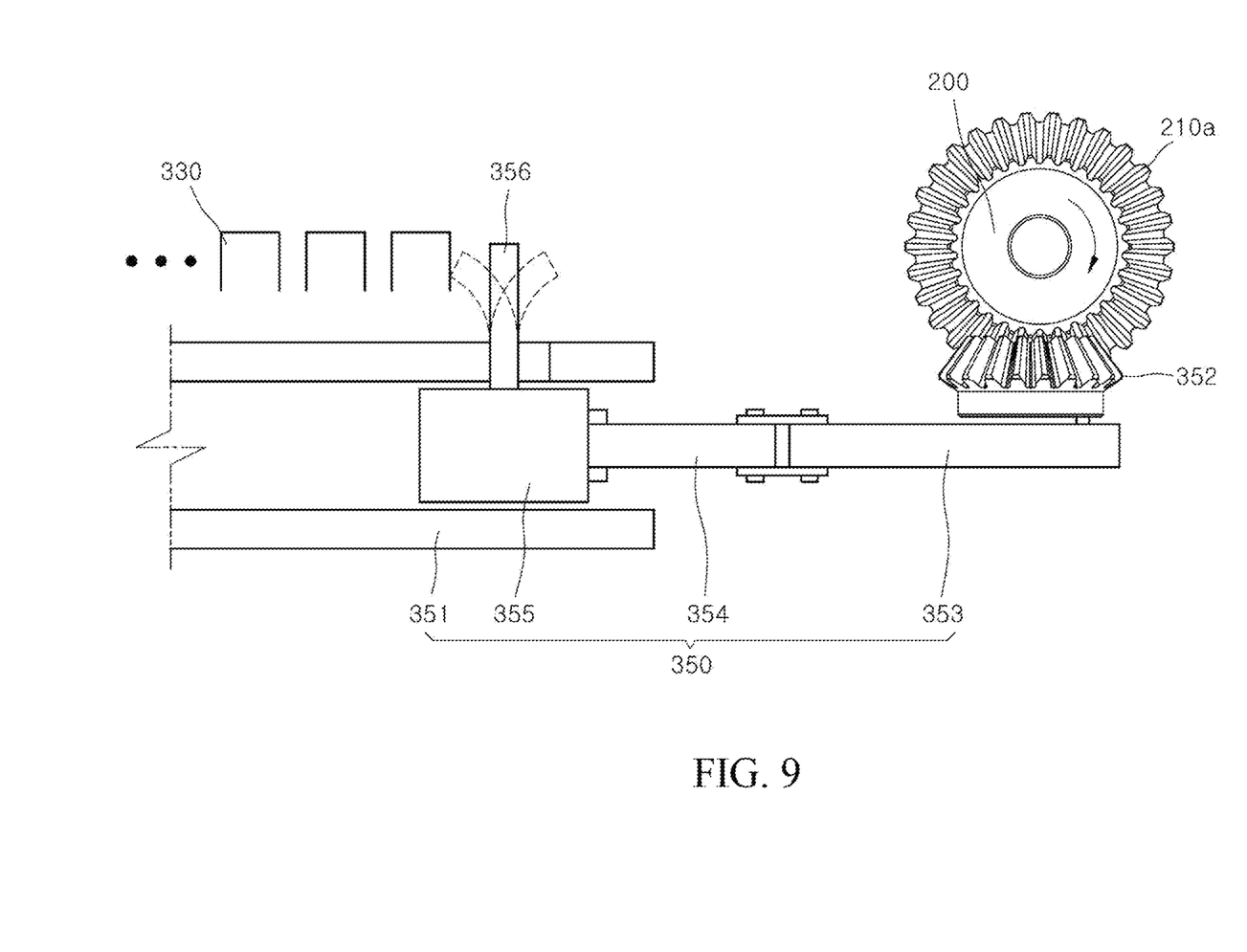
FIG. 9 is a view schematically illustrating hitting-electric generation device according to another embodiment of the present invention.

FIG. 9 is a view schematically illustrating hitting-electric generation device according to another embodiment of the present invention.

The hitting-electric generation device according to the present invention is slightly different from that according to a first embodiment in configuration. Hereinafter, in order to avoid duplication of description, only a configuration different from the configuration of the above-described first embodiment will be described.

Referring mainly to FIG. 9, a first bevel gear 210a may be provided in the rotation shaft 200 instead of the trigger 210 of the first embodiment. Here, a rotational motion of the rotation shaft 200 may be converted into a linear motion via the first bevel gear 210a.

Accordingly, a hitting part 350 may include a second bevel gear 352 interacting with the first bevel gear 210a, a rotation rod 353 which is eccentrically coupled, a straight rod 354 and a slider 355 connected thereto, a guide block 351 for guiding the slider 355, and a hitting-electric body 356 provided at one side of the slider 355. In addition, the plurality of hitting-electric devices 330 may be provided such that an opening is disposed in a direction facing the hitting-electric body 356.

Via such a configuration, stable power generation with the same speed and the same external force is possible, so that very high-efficiency power generation and power storage may be possible. That is, the rotational motion of the rotation shaft 200 may act as a piston reciprocating linear motion of a linear cam or a crankshaft, when the slider 355 moves at a predetermined speed in one direction by a predetermined distance, the hitting-electric body 356 attached to a linear motion shaft may be arranged in a line as when laundry was hung on a clothesline, and a predetermined and uniform external force is generated by hitting electric energy at the same speed to the fixed hitting-electric devices 330, so that high-efficiency power generation may be possible.

Meanwhile, the hitting-electric body 356 may be made of the same material as the second hitting bar 312 of the first embodiment. In the case of this, in order to secure a path for the hitting-electric body 356 to perform a reciprocating linear motion, the plurality of hitting-electric devices 330 may be moved while being hit by the hitting-electric body 356 and then repeat an operation of returning to an original state.

In addition, the hitting-electric body 356 may be made of a relatively soft material compared with that of the second hitting bar 312. In the case of this, the hitting-electric body 356 may repeat an operation of bending and returning to an original state while hitting the hitting-electric devices 330 as in an example of FIG. 9.

When the hitting-electric generation device according to an embodiment discussed above with reference to FIG. 9 is installed near a track at a platform, hitting-electric devices may be periodically hit by a wind generated when a subway enters and leaves the platform, which is a somewhat enclosed space. Therefore, when the hitting-electric generation device is installed near tracks of a subway platform, it is possible to implement dramatically high power generation efficiency compared with those installed outdoors.

Further, the hitting-electric generation device of FIG. 9 may be installed in the body of a moving means of transportation, such as a train or a bus, to implement high-efficiency power generation. This is because, when the hitting-electric generation device is installed at a roof of a train, hitting of the hitting-electric devices may be made steadily by a wind pressure applied while the train is running.

In the case of this, durability may be a problem because a wind pressure applied by a speed of the train is so strong. In order to solve this problem, it may be necessary to reduce an amount of air introduced into the hitting-electric generation device or to adjust hitting frequency and intensity for a plurality of hitting-electric devices by using a reduction gear.

Figure 10:
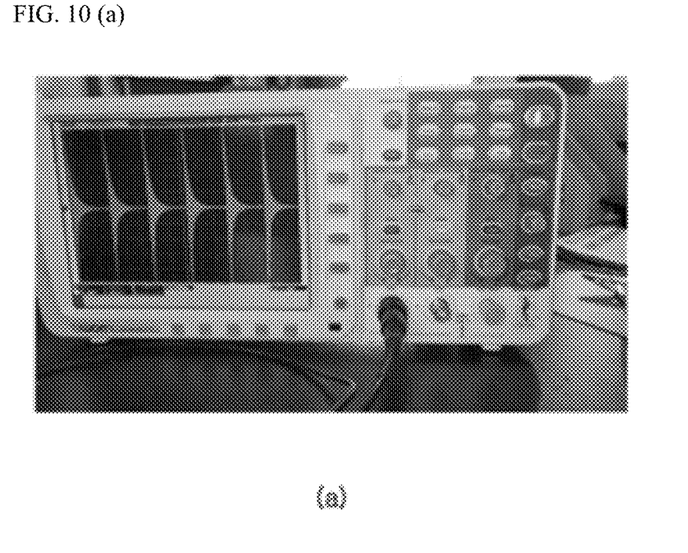

FIG. 10 is a photograph illustrating voltage properties generated via an hitting-electric device and a using the same according to an embodiment of the present invention.

Hereinafter, a process of electricity generation and light emission using the hitting-electric device and the hitting-electric generation device using the same according to the present embodiment will be described in detail with reference to FIGS. 1 to 8 and 10.

First, wind blowing to the left side is introduced via the antiline vane 111 of the fixed blade part 110, and a force is applied to the right side in the syncline vane 121 of the rotation blade part 120 so that the rotation blade part 120 is rotated in a counterclockwise direction. Accordingly, an external force stress due to eccentricity in the entire wind power collection unit 100 may be reduced, and wind power collection for the wind power collection unit 100 may be efficient and easy.

As the rotation shaft 200 is rotated in a counterclockwise direction, the trigger 210 drives the generation unit 300.

Then, as shown in FIGS. 3 and 4, the trigger 210 hits the first hitting bar 312, and accordingly, the hitting hub 311 and the second hitting bar 313 connected thereto may be driven and rotated in a clockwise direction. The second hitting bar 313 primarily hits an upward direction of the hitting-electric device 330 of FIG. 4 and hits a downward direction of the hitting-electric device 330 while being restored in an opposite direction by a torsion spring.

Then, a howling phenomenon due to hitting-electric power is generated in the plurality of hitting-electric devices 330 supported by the fork handle 322, and electricity is generated. Although not shown in the cathode wire part 334 and the drawing shown in FIG. 6, electricity is generated by being conducted by an anode wire part attached to an outer surface of the piezo thin film layer 340. At this point, howling vibration is propagated and electricity is generated also in the hitting-electric device 330, which interconnects lower and upper hitting-electric devices 330.

<Control Group>
1. Flat-panel type—Experiment with only one hitting-electric device
2. As a result of an oscilloscope voltage test measurement, when a unit and a hitting-electric method were the same and the experiment was performed, as shown in (b) of FIG. 7, a peak value is 500V, but a sine wave frequency region is not continued and the region is terminated immediately as only a peak is hit.
3. As a result of an LED light emission test, after blinking, the light emission rapidly decreases and the residual light disappears.

Embodiment

1. Tuning fork type—⊏-shape
(Experiment by connecting three hitting-electric devices in a fork shape as shown in FIG. 4)
2. As a result of an oscilloscope voltage test measurement, when a hitting-electric experiment is performed with an unit set to 100V per cell, a peak value came out as 500V+α as shown in (a) of FIG. 10 and a sine wave frequency range was wide and long.
3. As a result of an LED light emission test, light is emitted relatively brightly compared with the control group, and the light emission is maintained for a predetermined period and then gradually decreases.

As a result of such experiments, due to a structure of the fork module 320, howling to the hitting-electric device 330 is promoted, so that a generated voltage and duration may be significantly increased, and thus a total amount of electric energy to be generated can be increased and power generation efficiency can be improved.

In addition, via such a sounding induction surface part 333, when an impact is applied to a back surface of the hitting-electric device 330, that is, an opposite surface of the piezo thin film layer 340 by a hitting-electric power, microscopic elastic deformation of the hitting-electric plate 331 may be induced. However, since the hitting-electric plate 331 is provided at a predetermined thickness or more, macroscopic deformation is not occurred, so that durability may be maintained and the piezoelectric device may be advantageous in terms of easily torn or fatigue life.

Via such a step configuration, as the piezo thin film layer 340 is bonded to the hitting-electric device 330 having a predetermined thickness or more and a back surface of the hitting-electric plate 331 is hit, an indirect external force may be applied, so that durability of the device may be significantly improved, and as microscopic elastic deformation and restoration occur relatively compared with the related art, so that cracking or tearing of the piezoelectric device may be minimized, and thus fatigue life can be reduced, and due to a structure of the fork module 320, howling to the hitting-electric device 330 is promoted, so that a generated voltage and duration may be significantly increased, and thus a total amount of electric energy to be generated can be increased and power generation efficiency can be improved.

As described above, although the present invention has been described in detail by using preferred embodiments, a scope of the present invention is not limited to specific embodiments and should be construed according to the appended claims. In addition, those skilled in the art will understand that many modifications and variations are possible without departing from the scope of the present invention.

[Description of Reference Numerals]

| | |
|---|---|
| 100: Wind power collection unit | 110: Fixed blade part |
| 120: Rotation blade part | 200: Rotation shaft |
| 121: Syncline vane | 210: Trigger |
| 300: Generation unit | 310: Hitting part |
| 320: Fork module | 330: Hitting-electric device |
| 340: Piezo thin film layer | 350: Hitting part |
| 370, 370': Shock absorber | |

The invention claimed is:

1. A hitting-electric device comprising:
a hitting-electric plate to which the piezo thin film layer is bonded to one surface while a predetermined thickness is maintained by a predetermined size in a radial direction from a center;
a support guide part provided in an edge area of the hitting-electric plate and supporting the hitting-electric plate; and
a sounding induction surface part interposed between the hitting-electric plate and the support guide part, and tapered so that a cross-sectional thickness decreases from the hitting-electric plate toward the support guide part.

2. The hitting-electric device of claim 1,
wherein the hitting-electric plate is provided to be about 10 times thick compared with that of the piezo thin film layer,
a material of the hitting-electric plate is made of any one selected from phosphor bronze, stainless-steel, steel, non-ferrous metal plates, hard flat plastics, stones and pulled leather and
the sounding induction surface part is manufactured so that a howling effect is maximized and a forging rate increases from a center toward an outer side in a radial direction.

3. A hitting-electric generation device using a hitting-electric device comprising:
a wind power collection unit comprising a fixed blade part, and a rotation blade part, accommodated in the fixed blade part and provided to be rotatable relative to the fixed blade part;
a rotation shaft coupled to the rotation blade part and disposed extending downwardly, and provided with at least one trigger to which hitting-electric power is applied along an outer surface periphery; and
a generation unit provided at a lower portion of the wind power collection unit and generating electricity by a hitting-electric power, which the trigger hits.

4. The hitting-electric generation device using the hitting-electric device of claim 3,
wherein the generation unit comprise:
a hitting part which interacts with the trigger and rotates in a clockwise or counterclockwise direction in a predetermined angle; and
a fork module including a plurality of hitting-electric devices in which a piezo thin film layer is embedded at one surface.

5. The hitting-electric generation device using the hitting-electric device of claim 4,
wherein in the fork module, a plurality of piezos are coupled in a V, U, or ⊏-shape to form an opening at one side,
the hitting part is partially inserted into the opening, and
a fork handle for elastically supporting the fork module is connected to any one of the hitting-electric devices.

6. The hitting-electric generation device using the hitting-electric device of claim 4,
wherein the hitting-electric device comprises:
a hitting-electric plate to which the piezo thin film layer is bonded to one surface while a predetermined thickness is maintained by a predetermined size in a radial direction from a center;
a support guide part provided in an edge area of the hitting-electric plate and supporting the hitting-electric plate; and
a sounding induction surface part interposed between the hitting-electric plate and the support guide part, and tapered so that a cross-sectional thickness decreases from the hitting-electric plate toward the support guide part.

7. The hitting-electric generation device using the hitting-electric device of claim 6,
wherein the hitting-electric plate is provided to be about 10 times thick compared with that of the piezo thin film layer,
a material of the hitting-electric plate is made of any one selected from phosphor bronze, stainless-steel, steel plate, and non-ferrous metal plate, and
the sounding induction surface part is manufactured so that a howling effect is maximized and a forging rate increases from a center toward an outer side in a radial direction.

8. The hitting-electric generation device using the hitting-electric device of claim 4,
wherein in the fork module, a cathode wire part is partially interposed between the piezo thin film layer and the hitting-electric plate.

9. The hitting-electric generation device using the hitting-electric device of claim 3,
wherein an antiline vane having a convex curvature formed at one side is provided at the fixed blade part, and
a syncline vane having a concave curvature formed at the other side is provided at the rotation blade part so as to be curved in a direction opposite to the antiline vane.

10. The hitting-electric generation device using the hitting-electric device of claim 4,
wherein the generation unit further comprises a shock absorber,
wherein the shock absorber comprises:
a pair of support plates disposed adjacent to a hitting hub; and
a buffer spring interposed between the support plate and the hitting part to which the hitting part is elastically biased.

11. A hitting-electric generation device using a hitting-electric device comprising:
a wind power collection unit including a fixed blade part, and a rotation blade part, accommodated in the fixed blade part and provided to be rotatable relative to the fixed blade part;
a rotation shaft coupled to the rotation blade part and disposed extending downwardly; and
a generation unit provided at a lower portion of the wind power collection unit and generating electricity by a hitting-electric power, which the trigger hits,
wherein the generation unit comprise:
a fork module comprising a plurality of hitting-electric devices in which a piezo thin film layer is embedded at one surface; and
a hitting part connected to the rotation blade part and sliding forward or backward in one direction to hit the fork module,
wherein the hitting part comprise:
a second bevel gear interacting with the first bevel gear;
a rotation rod, which is eccentrically coupled, and a straight rod connected thereto;
a slider connected the straight rod;
a guide block for guiding the slider; and
a hitting-electric body provided at one side of the slider.

\* \* \* \* \*